Jan. 12, 1954  F. CUNNINGHAM, JR., ET AL  2,666,137
CATHODE-RAY STORAGE TUBE

Filed Dec. 10, 1945  2 Sheets-Sheet 1

*INVENTORS*
FREDERIC CUNNINGHAM JR.
ALFRED G. EMSLIE
*BY*
William D. Hall
ATTORNEY

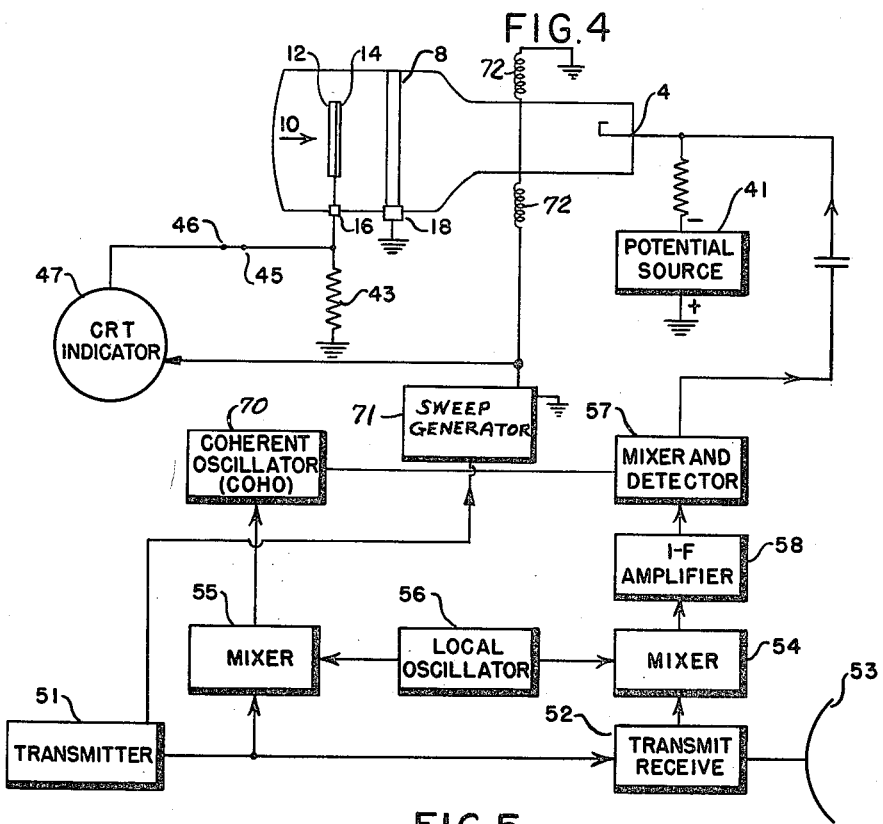
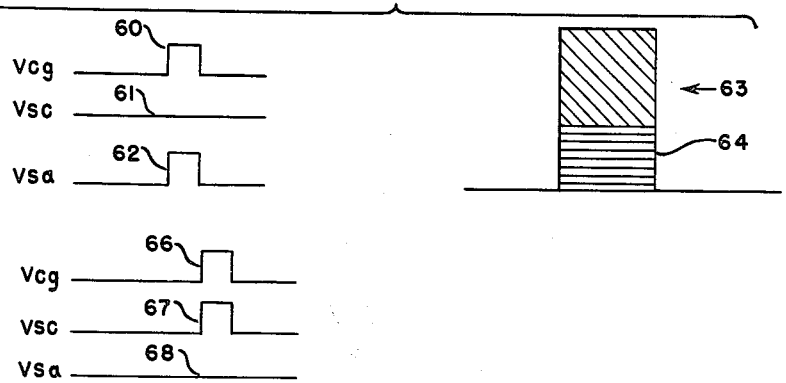

Patented Jan. 12, 1954

2,666,137

UNITED STATES PATENT OFFICE 2,666,137

CATHODE-RAY STORAGE TUBE

Frederic Cunningham, Jr., Belmar, N. J., and Alfred G. Emslie, Boston, Mass., assignors, by direct and mesne assignments, to the United States of America as represented by the Secretary of War Application December 10, 1945, Serial No. 634,079

2 Claims. (Cl. 250—27)

The present invention relates to radio object locating systems adapted to distinguish fixed objects from moving objects, and it relates more particularly to a storage device embodied in such a system whereby moving objects only are indicated.

In the usual radio object locating system wherein short duration high carrier frequency exploratory pulses of radiant energy are transmitted in a directional beam, so-called permanent echoes such as those from hills, trees, and buildings frequently prevent perception of moving objects. Several systems have been devised that distinguish fixed objects from moving objects by the character of the video pulses derived from object-returned echo pulses. These systems are all based upon some method of obtaining reference oscillations synchronized in fixed phase to the exploratory pulses of radiant energy, receiving echo pulses returned from objects, and combining them with said reference oscillations to obtain video pulses from the resultant combination.

The above mentioned reference oscillations may be provided either by a signal reflected from the fixed object, or by a synchronized local oscillator providing continuous wave or interrupted continuous wave oscillations. In general, systems of the first type (those utilizing echoes from fixed objects) may be referred to as "non-coherent pulse echo" systems whereas those of the latter type (utilizing locally generated reference oscillations) may be called "coherent pulse echo systems."

The amplitude of the video pulses obtained is dependent upon the relative phase between the reference oscillations and the phase of the returning echo pulses. Echo pulses from fixed objects always have the same phase relation with respect to the reference oscillations and hence, when combined therewith provide video pulses having a non-varying amplitude. Echo pulses from moving objects, on the other hand, have a progressive phase shift with respect to the reference oscillations (due to the changing range of the moving objects) and hence are evidenced by video pulses having a cyclical variation in amplitude.

Although the character of the video pulses serves to distinguish fixed objects from moving objects, it is often desirable to indicate moving objects only. One manner of accomplishing this is to provide a means whereby electrical energy may be "stored" for a period of time, thus permitting a first pulse of energy to be compared readily with a second pulse of energy appearing a certain time later. As video pulses manifesting fixed objects do not vary in amplitude, there is no difference in amplitude between any one pulse and the next succeeding one. Video pulses indicating moving objects, on the other hand, are varying in amplitude and thus there is a difference in amplitude between any two successive pulses. The storage device, therefore, must be able to be responsive to this difference in amplitude and thereby provide a signal only for moving objects. A radio object locating system that distinguishes between fixed objects and moving objects and provides an indication of the moving objects only is generally referred to as a moving target indication (MTI) system.

It is therefore an object of the present invention to provide a radio object locating system, adapted to distinguish fixed objects from moving objects, which embodies an energy storage device.

It is another object of the present invention to provide a radio object locating system having an energy storage device comprising an evacuated tube having a screen bombarded by an electron beam, said screen having its bombarded surface coated with a thin layer of insulating material.

It is still a further object to provide a novel, yet relatively simple energy storage device adapted to distinguish between signals having predetermined characteristics.

The above, and further objects and advantages will be more fully understood from the following description when taken in connection with the accompanying drawings wherein:

Fig. 4 is a block diagram of an MTI system utilizing a storage tube of the character hereinafter described; and Fig. 5 is a graphical representation of voltages existing between certain electrodes of the storage tube.

Figure 1:
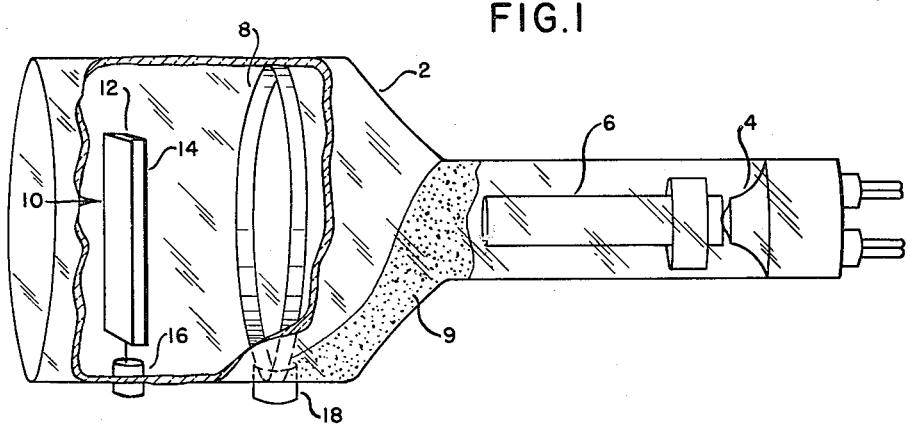
Fig. 1 illustrates one embodiment of the storage tube showing the basic elements thereof and wherein a section is cut away in order to more clearly show certain elements.

The storage device to be considered provides a simple and yet reliable means for comparing successive pulses of electrical energy, and Fig. 1 shows such a storage tube containing the basic required elements. An evacuated glass envelope 2 contains a cathode 4, a focusing (first) anode 6 which forms the electrons emitted from cathode 4 into a beam, a second anode 8, or collector anode as it may also be called, and a storage plate element 10. Second anode 8 may consist of a metal ring having a diameter sufficient to prevent direct interference between the ring and the electron beam. On the inside of the glass envelope a metallized coating 9 in electrical contact with the metallic ring may likewise function to collect electrons and thus form a second and integral part of second anode 8. The storage plate element 10 comprises a screen which is formed on plate 12 by coating one side of said plate with an insulating material 14 such as typified by zinc orthosilicate. Insulating material 14 in combination with plate 12 forms a myriad of capacitors, each portion of the insulating material forming one side of a condenser, and plate 12 forming the other and common side for all. This insulated portion is bombarded by the electron beam heretofore mentioned, thereby causing secondary electrons to be emitted from insulating material 14. Storage plate element 10 is electrically connected to terminal 16 which provides an external connection therefor and in a similar manner, an external connection for second anode 8 is provided by terminal 18. A control grid may also be provided in order to allow further control of the electron beam. By maintaining the potential between cathode 4 and second anode 8 above a certain minimum value such an evacuated tube may be utilized to store electrical energy for a period of time, as more fully explained hereinafter.

Some of the secondary electrons emitted, during bombardment, from the screen of insulating material 14 are drawn to collector anode 8, the number of secondary electrons so attracted being a function of the potential between the second anode 8 and cathode 4. In order to obtain a ready understanding of the present storage tube and of the requirement for a critical second anode to cathode potential the theoretical graphs shown in Fig. 2 and Fig. 3 will be discussed. Each graph illustrates the effect of various electrode potentials on the secondary emission from insulating material 14, and the resultant change in potentials on various elements of the tube.

For ease and clarity of description certain specific voltages will be discussed. It is to be clearly understood however that these are not representative values but are merely used by way of example only.

Figure 2:
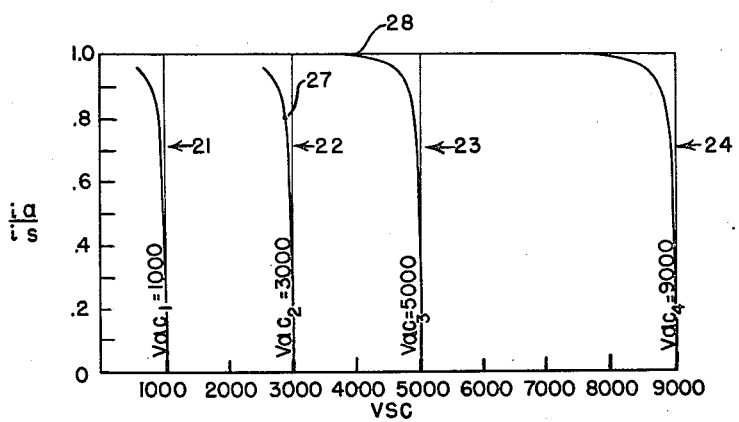
Fig. 2 is a theoretical graph which enables a better understanding of the present invention.

Reference is made to Fig. 2 which shows a series of curves wherein the voltage between screen and cathode ($V_{sc}$) is plotted as an abscissa and the ratio $$i_a/i_s$$

is plotted as an ordinate, where $i_a$ is the actual secondary emission current collected by second anode 8 and where $i_s$ is the saturation secondary electron emission current emitted by the screen of insulating material 14. Another way of defining $i_s$ and $i_a$ is: The saturation secondary emission current ($i_s$) is proportional to the number of secondary electrons emitted from insulating material 14 for each primary electron bombarding said material, and the actual secondary emission current ($i_a$) is proportional to the number of secondary electrons collected by second anode 8. In the graph shown, four curves are plotted, the curves showing the above relation for each of four arbitrarily chosen second anode to cathode voltages.

For example, assume curve No. 21 to be drawn for the instance when the voltage between the second anode and cathode is equal to ($V_{ac1}$), where $V_{ac1}$ is arbitrarily chosen as being 1,000 volts. From examination of the curve, it can be seen that if the screen to cathode voltage ($V_{sc}$) is less than $V_{ac1}$, a certain number of electrons will be drawn to the anode and, in fact, if the difference between $V_{sc}$ and $V_{ac}$ is great the potential between screen and anode $V_{sa}$ (i. e. the potential between screen and anode $V_{sa}$ is large) nearly all of the secondary electrons emitted will be drawn to the collector anode (i. e. ratio of $i_a/i_s$ approaches 1.0). As the potential ($V_{sc}$) between the screen to cathode increases, fewer and fewer electrons are drawn to the collector anode (i. e. ratio of $i_a/i_s$ approaches 0.0) and a limit is reached when the screen to cathode voltage equals the anode to cathode voltage $$(V_{sc}=V_{ac1})$$

At this instance, $V_{sa}=0$ and substantially no electrons flow from the screen to the anode. $i_a/i_s$ is thus truly a function of $V_{sa}$ but $$V_{sa}=V_{sa}=V_{ac}-V_{sc}$$

Actually, when $V_{sc}$ is equal to $V_{ac1}$, a few free electrons may still reach the anode but the quantity will be very small.

Curve No. 22 is drawn for a similar condition but the second anode to cathode voltage is greater than in the above discussed instance, and this voltage is represented as $V_{ac2}$, again by way of example, $V_{ac2}$ is assumed to be a specific voltage such as 3,000 volts. Once again it can be seen that if the screen to cathode voltage ($V_{sc}$) is very much less than the second anode to cathode voltage ($V_{ac2}$), (i. e. $V_{sa}$ large) most of the secondary electrons emitted from the screen will reach the collector anode. As $V_{sc}$ approaches $V_{ac2}$, the potential ($V_{sa}$) between the screen and second anode becomes smaller, and fewer and fewer electrons flow from the screen to the second anode until eventually a point is reacsed when $V_{sc}$ is equal to $V_{ac2}$ at which time no electrons flow from the screen to the anode.

A curve 23 similar to curves 21 and 22 is also shown in Fig. 2 but in this case, the voltage from second anode to cathode is represented as $V_{ac3}$, and is assumed to be 5,000 volts. Curve 24 is similar to the others shown and is drawn for a second anode to cathode voltage $V_{ac4}$ of 9,000 volts.

Figure 3:
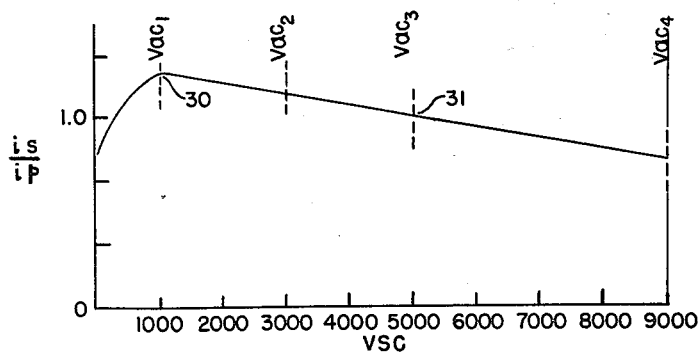
Fig. 3 shows a different theoretical graph which likewise enables a better understanding of the present invention.

The importance of the graphs discussed above will be more fully realized when taken into consideration with Fig. 3 wherein the ratio of the maximum secondary emission current ($i_s$) to the primary electron current ($i_p$) bombarding the screen is plotted as an ordinate and the voltage between the screen and cathode ($V_{sc}$) is plotted as an abscissa. It can be seen from the graph shown in Fig. 3 that for relatively low screen to cathode voltages, there are more secondary electrons released from the bombarded insulating material 14 (screen) of storage plate element 10 than there are primary electrons striking the screen (i. e. ratio of $i_s/i_p$ is greater than 1.0). As the screen to cathode voltage ($V_{sc}$) increases in the lower range of voltages, the ratio $$\left(\frac{i_s}{i_p}\right)$$

also increases until at point 30 on the curve, the maximum number of secondary electrons are emitted for each primary electron striking the screen. Then, as $V_{sc}$ is increased still more, fewer secondary electrons are emitted for each primary electron striking the surface. This continues until point 31 on the curve is reached at which point the number of secondary electrons emitted is exactly equal in number to the number of bombarding primary electrons. From then on any increases in the screen to cathode voltage ($V_{sc}$) means that the number of primary electrons bombarding the surface exceeds the number released by secondary emission from insulating material 14.

Attention is directed to the fact that in order to have the potential of the screen remain stable while being bombed by a homogeneous beam of primary electrons, and thereby maintain a condition of equilibrium, the number of primary electrons bombarding the surface must be equal to the number of electrons leaving the surface and collected by the second anode. This means that the ratio of $i_a/i_p$ must equal unity or $$\frac{i_a}{i_p} \cdot \frac{i_s}{i_p} = \frac{i_a}{i_p} = 1$$

Thus from the above expression, it can be seen that the product of the ordinates of the curves shown in Fig. 2 and Fig. 3 should always be equal to unity in order for a state of equilibrium to exist.

The graph of Fig. 3 described above will now be considered together with the graphs shown in Fig. 2. Referring now to Fig. 3, the instance when the screen to cathode voltage $V_{sc}$ is equal to 1,000 v. will be considered. At this screen to cathode voltage, the number of secondary electrons emitted from the bombarded surface for each bombarding primary electron is quite large and in fact is a maximum. It is evident that when so many electrons are being emitted from the bombarded surface only a comparatively few have to reach the collector anode to fill the previously stated requirement for equilibrium, namely, the product of the ordinates of Fig. 2 and Fig. 3 must be equal to unity.

Assume for the moment that the screen to cathode voltage is 1,000 v. and that the potential of the screen is likewise equal to 1,000 v., and at this instant, the ratio of $i_s/i_p$ is appreciably greater than unity (is indeed a maximum) and at this instant, the ratio of $i_a/i_s$ is zero and substantially no electrons flow from the screen to anode. Thus, the electrons collect on the screen thereby causing the screen to obtain a negative charge. This charge continues causing the screen to cathode voltage to vary in accordance with curve 21 and this charge continues until $i_a/i_p$ is equal to unity, said point being when the product of the ordinates of Fig. 2 and Fig. 3 is equal to unity. At unity, the voltage between the screen and anode is sufficient to attract as many electrons from the screen to the anode as there are primary electrons striking the screen. As the ratio of $i_s/i_p$ is a maximum at a screen to cathode voltage of 1,000 v., the proportion of the secondary electrons that must be attracted to the anode in order to maintain a state of equilibrium is relatively small and hence the screen to anode voltage may be small. Thus, the voltage between the screen and cathode $V_{sc}$ is practically the same as the voltage between the anode and cathode ($V_{ac1}$). In other words, the difference in potential between the screen and anode need only be relatively small in order for the anode to collect the necessary secondary electrons from the screen, and the screen in effect, has followed the anode.

Next consider the instance when the screen to cathode voltage is equal to 3,000 v. From the curve shown in Fig. 3, it can be seen that at this voltage the ratio of secondary electrons emitted to the primary electrons $$\left(\frac{i_s}{i_p}\right)$$

has decreased but the ratio is still greater than one (1). Thus, in order to maintain equilibrium, that is, have the product of the ordinate of Fig. 3 (at 3,000 v.) and the ordinate of curve 22 (Fig. 2) be equal to unity, a still greater proportion of secondary electrons must reach the second anode. This means that in order to get a sufficient number of electrons to the second anode when the ratio of $i_s/i_p$ has increased, the screen must charge more negatively in order to have the screen to anode voltage be sufficient to attract a sufficient number of electrons and from the figure, the screen may have to charge negatively until the screen to cathode voltage corresponds (by way of example) to point 27 on curve 22 of Fig. 2.

Now consider a screen to cathode voltage of 5,000 v. and consider the screen to be momentarily at this potential. Then from the figure, it can be seen that the ratio of $i_s/i_p$ is equal to unity but at this instant, the ratio of $i_a/i_s$ is substantially zero and thus no electrons flow from the screen to the anode. The result is that electrons collect on the screen thereby causing the screen to charge negatively. This charge continues in accordance with curve 23 of Figure 2, and the screen continues to charge negatively until $i_a/i_s$ is equal to unity at which instance the potential of the screen is approximately equal to 4,000 v. and corresponds to point 28 of curve 23.

Thus, a state of equilibrium is reached and it is readily seen that the product of the ordinates of curve 23 and the curve of Fig. 3 is equal to unity at this instance. Thus, there is a difference of 1,000 v. between the screen and the anode, which is required to collect all of the electrons to said anode.

Next consider the instance when the screen to cathode voltage is equal to 9,000 v. and as before assume that the screen is momentarily at this potential. Then from Fig. 3, it can be seen that the ratio of $i_a/i_p$ is less than unity and that there are more primary electrons striking the surface than there are secondary electrons leaving the surface and reaching the anode. As a result, the primary electrons accumulate on the screen thereby causing the screen to charge negatively with respect to the anode and causing the screen to cathode voltage to vary in accordance with curve 24 (Fig. 2). Indeed the screen will continue to charge negatively until a point of equilibrium is reached, said point being when the ratio of $i_a/i_p$ is equal to unity and this only occurs when the screen to cathode potential reaches 5,000 v. At this instance, $i_a/i_s$ is equal to unity, and $i_s/i_p$ is equal to unity.

In view of the foregoing description, it can be seen that since the screen to cathode voltage exceeds 5,000 v., the screen can no longer follow the anode and instead will remain fixed at 5,000 v. Thus it is evident that when the screen to cathode voltage exceeds a certain critical value (corresponding to point 31 Fig. 3) the potential of the anode can no longer "follow" the potential of the screen. Accordingly above this critical voltage any increase in the screen to cathode voltage causes the potential between the screen and anode to increase a corresponding amount.

Attention is again directed to the fact that the voltages used in the foregoing discussion are introduced to simplify and clarify the description and are used by way of example only.

The above mentioned, critical screen to cathode potential is hereinafter referred to as the "sticking potential" and may be defined as follows: the "sticking potential" is that potential between the screen and cathode at which the ratio between the number of emitted secondary electrons to the number of bombarding primary electrons is equal to unity. This potential, in the example used, is seen to be 5,000 volts. If desired "sticking potential" may be defined in terms of the anode to cathode voltage; the sticking potential is the anode to cathode potential above which the screen no longer "follows" the anode.

The storage action of the present tube may be understood by reference to Fig. 4 which shows a schematic circuit diagram embodying the storage tube and wherein like reference numerals designate like parts shown in Fig. 1. Only components of the tube necessary to an understanding of the storage action are shown in Fig. 4.

Fig. 5 is to be considered in connection with Fig. 4 and it illustrates graphically certain voltages occurring between the cathode and ground ($V_{cg}$) the screen and the cathode ($V_{sc}$) and the screen and the anode ($V_{sa}$).

Referring now to Fig. 4, which is one embodiment of a circuit utilizing a storage tube, a potential source 41 has its negative side connected to cathode 4 and its positive side connected to ground. Potential source 41 provides a voltage between second anode 8, which is connected to ground by means of external connection 18, and cathode 4. This voltage is greater than the sticking potential of the insulating material 14 which forms a screen on one side of plate 12, the two together comprising storage plate element 10. Thus, potential source 41 provides the second anode to cathode voltage hereinafter referred to as $V_{ac}$. Plate 12, one side of which is coated with insulating material 14, is connected to ground through a load impedance, which may be a load resistance 43, by means of external connection 16. If desired the load impedance may be connected from the collector anode to ground rather than from the screen to ground, the important consideration being that the load impedance must be included in the screen to second anode circuit. Deflecting coils 72, 72 are associated with the storage tube so that the electron beam emanating from cathode 4 may be made to sweep across insulating material 14, in at least one direction. Although deflecting coils are shown, deflecting plates may be substituted therefor. In addition a control grid may be provided so that the electron beam can be blanked out in order to allow the beam to sweep in one direction only.

The signals to be stored are applied to cathode 4 where they act in such a manner as to modulate the potential of the cathode with respect to ground. The graph of this voltage then appears as shown in Fig. 5 where graph 60 represents (in idealized form) the modulating pulse applied to cathode 4 thereby causing the cathode voltage to rise as shown. The instantaneous effect of this rise in voltage is to cause the screen to cathode voltage to increase, but as the tube is operating above its sticking potential this would cause the ratio of $i_s/i_p$ to be less than unity. As described in connection with Fig. 2 and Fig. 3 such a condition cannot exist and the potential of the screen must rise to follow the cathode thereby causing the potential between the screen and anode to increase an amount corresponding to the amplitude of the pulse applied to the cathode. This potential between screen and cathode remains substantially constant as represented by the idealized graph 61. The potential between screen and anode is thus represented by graph 62 the pulse there shown corresponding to the rise in cathode potential due to the applied signal.

Another way of seeing this action is to consider the screen as consisting of a myriad of small capacitors where the individual microscopic elements of the insulating material 14 form one side of a capacitor and plate 12 forms the other and common side for each. If then an unmodulated beam is made to sweep across the insulating material each capacitor, swept by the beam attains the same charge. If however the beam is modulated by a pulse signal such as shown in graph 60, Fig. 5 the portion of the screen under the electron beam during the period the beam is modulated charges to a value equal to the sticking potential plus the amplitude of the modulating pulse. Thus each composite condenser attains a charge corresponding to the signal voltage on the cathode i. e. the screen "follows" the cathode.

As the electron beam is sweeping across the screen, only the portion bombarded by the electron beam at the instant the pulse is applied to cathode 4, must rise in potential, and in order for this to happen, the portion of the insulated screen under the electron beam must lose electrons. This is accomplished in the following manner. Electrons flow from ground through load resistance 43 to plate 12 which forms a backing for the insulating material 14, the two together comprising, in effect, a capacitor. The electrons reaching plate 12 repel electrons from the insulated material 14 and hence cause the portion of the insulating material under the electron beam to lose electrons. This causes this portion of the insulated screen to be raised in potential in an amount corresponding to the rise in the cathode voltage.

Assume that the next pulse applied to cathode 4 is of lower amplitude but occurs at the same point on the time base. The portion of the insulating material 14 under the electron beam need not be as positive with respect to the cathode as it was for the previously applied larger amplitude pulse. Consider pulse 63, shown in Fig. 5, where the over-all amplitude of the pulse there shown represents the amplitude of the pulse first applied to cathode 4 and where the horizontally hatched portion 64 of pulse 63 represents the magnitude of the second and lower amplitude pulse applied to cathode 4. During the sweep within which the first pulse was applied, the portion of insulating material 14 directly under the electron beam at the instant the pulse was applied had its potential raised with respect to the anode an amount substantially proportional to the over-all amplitude of the pulse.

On the next sweep during which the lower amplitude pulse (shown as horizontally hatched pulse 64) is applied, the potential of the screen to cathode must remain substantially constant. As the amplitude of this second pulse is smaller than the amplitude of the first applied pulse, the portion of the screen under the electron beam need not be as positive with respect to the cathode as it was for the previously applied larger amplitude pulse and thus, the screen must lose some of its positive potential. The potential that must be lost is proportional to the diagonally cross-hatched area 65 of pulse 63, and in order to accomplish this change in potential, the portion of the screen under the electron beam which had its potential raised by the first applied pulse must now gain additional electrons. This means that there is an electron flow in the opposite direction (electrons flow through load resistance 43 to ground) thereby partially discharging the condenser formed by plate 12 and insulating material 14. The additional electrons causing this partial discharge are obtained from the primary electron beam striking the insulating material.

In view of the above explanation, it is evident that if successive pulses applied to cathode 4 are varying in amplitude, the portion of insulating material 14 directly under the beam during the interval of time that the pulse is applied must change in potential. This change in potential is accompanied by a flow of electrons through load resistance 43, this current developing a voltage across said resistance which appears at output terminal 45 in the form of a pulse.

If successive pulses are of the same amplitude, there is no signal developed across load resistance 43, as is readily apparent from the following description.

Assume that the second pulse applied to cathode 4 is exactly the same as the first pulse applied thereto and occurs at the same point on the time base. Then as the cathode potential rises, the voltage between the screen and cathode ($V_{sc}$) must remain constant as previously mentioned and hence the potential of the screen must rise. But the particular point of the screen under the electron beam (when the second pulse is applied) is already at a higher potential than the remaining portions of the screen due to the action of the previous signal. Hence, no additional change in potential is required, no charging current flows through load resistance 43, and no signal appears across output terminal 45. If desired the signals developed across load resistance 43 and appearing at terminal 45 may be indicated visually by connecting terminal 45 to terminal 46 which thus connects the output of the storage tube to a cathode ray tube indicator 47, as will appear more fully hereinafter.

The importance of maintaining $V_{ac}$ above the sticking potential may be readily understood by considering the conditions to be the same as before except that potential source 41 (Fig. 4) provides an anode to cathode voltage less than that of the sticking potential of the insulating material 14 which forms the screen of storage plate element 10. As before, upon application of a pulse to cathode 4, the voltage of cathode 4 rises as shown by pulse 66 (Fig. 5). In the present instance as potential source 41 is less than the sticking potential, the voltage $V_{sc}$ between the screen and cathode 4 may likewise increase as shown by pulse 67. Thus the potential of the screen with respect to the anode $V_{sa}$ will not change appreciably (it remains substantially constant as shown in graph 68) and no signal appears at output terminal 45 (Fig. 4).

It is therefore evident that in order to have an evacuated tube of the character described function as a storage device, it is preferable that the potential between the second anode and cathode be sufficient to cause the screen to cathode voltage $V_{sc}$ to be at or above the sticking potential. If this is done, any increase in cathode potential is manifested by a similar increase in the screen to anode potential ($V_{sa}$) and a signal is developed across load resistance 43. Actually some degree of storage may be obtained even if the voltage between anode 8 and cathode 4 is slightly below the sticking potential of insulating material 14. For as pointed out in connection with the description of Fig. 2 and Fig. 3, even when $V_{sc}$ is less than, but close to the sticking potential, the screen has difficulty in following the anode and there is an appreciable potential difference between the screen and anode, thereby causing a signal to be developed across load resistance 43.

The storage tube of the type described has a great many applications and is of invaluable use in a radio object locating system which is adapted to distinguish fixed objects from moving objects. By the use of such a novel and yet relatively simple storage tube, moving objects may be indicated to the exclusion of fixed objects. A radio object locating system of this general character is described in connection with Fig. 4 wherein output terminal 45 may be connected to terminal 46 of Fig. 4, as heretofore mentioned, and cathode 4 may be connected to the output of the following described apparatus shown in Fig. 4.

Fig. 4 further shows one embodiment of a radio object locating system adapted to provide information which may distinguish fixed objects from moving objects in accordance with the general method heretofore described. Transmitter 51 provides short duration high carrier frequency exploratory pulses of radiant energy which may be transmitted through transmit-receive switch 52 to directional antenna 53.

Transmit-receive switch 52 functions to connect transmitter 51 to directional antenna 53 while exploratory pulses are being transmitted, and to disconnect mixer 54 (and associated circuits) from the transmitter. During the interval between transmitted pulses and while echo pulses are being received, these connections are reversed and transmitter 51 is disconnected from directional antenna 53, and mixer 54 is connected to the directional antenna by means of transmit-receive switch 52.

A portion of each exploratory pulse is applied to mixer 55, a second input to said mixer consisting of continuous wave oscillations from local oscillator 56. The two inputs to mixer 55 are mixed therein and the beat frequency output, consisting of pulsed radiant energy having an intermediate carrier frequency, is applied as a synchronizing pulse to coherent oscillator 70 or "coho" as it is sometimes called. The oscillations issuing from coherent oscillator 70 are thus synchronized in fixed phase with the transmitted exploratory pulses and these may act as reference oscillations for the system. These reference oscillations are then applied to mixer and detector 57.

Echo pulses received at directional antenna 53 are applied to mixer 54, a second input to said mixer consisting of another output from local oscillator 56. The beat frequency output from mixer 54 consisting of echo pulses having an intermediate carrier frequency is then applied to intermediate frequency amplifier 58, the output of amplifier 58 providing a second input to mixer and detector 57.

The two inputs to mixer and detector 57 are algebraically combined therein, and the resultant combination detected to provide video pulses. The pulse input to mixer and detector 57 reinforces or opposes the reference oscillations to a degree depending upon the relative phase between the two. As a result, the video pulses have an amplitude depending on the relative phase of the echo pulses and the reference oscillations. Due to the fact that echo pulses from stationary objects always have the same phase with respect to the reference oscillations, the video pulses manifesting these stationary objects have a non-varying amplitude. On the other hand, echo pulses from moving objects have a varying phase and video pulses manifesting moving objects therefore have a changing amplitude.

The output from mixer and detector 57 may then be applied to cathode 4 of the storage tube. In accordance with the foregoing description of Fig. 4, it is evident that only pulses manifesting moving objects appear at output terminal 45 and appear on cathode ray tube indicator 47. Sweep generator 71, which is synchronized by transmitter 51, is connected to deflection coils 72, 72 and cathode ray tube indicator 47 for deflecting the electron beams thereof synchronously with the pulse repetition rate of transmitter 51.

As the storage tube must be operated in the neighborhood of, or above, the sticking potential, it is desirable to have plate 12 coated with an insulating material 14 which has a low sticking potential. One advantage of this is that the choice of a material having a low sticking potential will allow the anode to cathode potential to be relatively low. Low potentials minimize the possibilities of spark-overs in the tube, and likewise simplify the construction of the electrical circuits associated therewith.

The operation of the tube is not limited to any one type of insulating material and, in fact, there are a great many materials that may be employed. In addition to zinc orthosilicate which was heretofore mentioned, other materials such as calcium tungstate, cadmium sulfide, and potassium chloride as well as many others may also be used. The insulating material should be deposited uniformly over at least one surface of the plate and must be substantially homogeneous. Otherwise each portion of it will have a different sticking potential which might interfere with the proper operation of the tube. The material may be applied by flowing or spraying a liquid suspension over the plate but in order to get the homogeneity desired it is preferable that the insulating material be deposited by evaporation.

As was the case with the insulating material, the plate carrying this material may be made of a number of different materials. Preferably it should be a metal that has a fairly constant coefficient of expansion so that the insulating material will remain firmly adhered thereto even as the metal plate undergoes changes in temperature. One such metal that may be used is aluminum and, if desired, the aluminum may first be oxidized in order that the insulating material may be more firmly held thereto.

Although the storage action of the tube is described in connection with pulse type signals applied to the cathode 4, other type signals may also be stored. As an example, a signal to be stored may be applied to the storage tube during one sweep of the electron beam across the insulating material. The insulating material then attains a potential as described heretofore; and this may be held by the insulating material for an appreciable length of time. At some time later, the electron beam, this time not modulated by a signal, may be made to sweep across the insulating material and remove the charge thereon. This causes a signal to be developed at the output terminal of the storage tube where said signal is of the same general character as the one originally applied to the storage tube.

Various modifications and embodiments of the invention are possible, as will be readily understood. For example, the insulating material may be deposited upon an interior wall of the envelope and the metallic plate may be cemented or otherwise suitably fastened on the outside of the glass envelope. In such an instance, the charging of the insulating material is accomplished through the capacitance which is formed by the insulating material the glass and the metallic plate.

It is believed that the theory described heretofore is substantially correct. However, it is to be understood that it is not desired to limit or restrict the invention to such theory. It is likewise to be understood that the invention is not to be limited to the above described methods of beam modulation.

Having thus described the invention what is claimed as new and desired to be secured by Letters Patent is:

1. A storage circuit for storing electrical energy including a single-beam cathode ray tube of a character adapted to provide an output in response to periodic successive pulses having different amplitudes, and no output for successive pulses having like amplitudes, said tube comprising an evacuated envelope including a cathode, a collector anode and a metallic plate, said plate having one surface thereof coated with an insulating material having a predetermined sticking potential characteristic, an electrical connection from the uncoated surface of said plate to a point external to the envelope of said evacuated tube, an output load impedance electrically connected between said connection and said collector anode, means for focusing electrons emitted by said cathode into a single beam within said evacuated envelope, said coated surface of said plate being in the path of said single electron beam, means connected to said tube and synchronized with said periodic successive pulses for sweeping the single beam in at least one direction across said plate isochronously with said pulses, means for maintaining the potential between said cathode and said collector anode above a predetermined potential, said predetermined potential being substantially equal to the sticking potential, and means for applying said successive pulses between said cathode and collector anode.

2. A cathode ray tube circuit adapted to store electrical energy including a single-beam storage tube having an evacuated envelope containing a cathode, a collector anode, and a metallic plate, said plate having one surface thereof coated with an insulating material having a predetermined sticking potential characteristic, an electrical connection from the uncoated surface of said plate to a point external to said evacuated envelope, means for focusing electrons emitted by said cathode into a single beam within said tube, said coated surface of said plate being in the path of said single electron beam, means connected to said tube for cyclically sweeping the single beam in at least one direction across said plate, and means connected between said cathode and said collector anode for impressing a voltage above a predetermined value therebetween, said predetermined value being substantially equal to the sticking potential of said insulating material, means for impressing cyclical signal voltages isochronous with the sweep of said single beam between said cathode and said collector anode and means connected between said connection and said collector anode for deriving output signals.

FREDERIC CUNNINGHAM, Jr.
   ALFRED G. EMSLIE.

References Cited in the file of this patent

UNITED STATES PATENTS

| Number | Name | Date |
|---|---|---|
| 2,403,562 | Smith | July 9, 1946 |
| 2,416,895 | Bartelink | Mar. 4, 1947 |
| 2,422,135 | Sanders | June 10, 1947 |
| 2,437,173 | Rutherford | Mar. 2, 1948 |
| 2,464,420 | Snyder | Mar. 15, 1949 |
| 2,491,450 | Holmes | Dec. 13, 1949 |
| 2,512,144 | Emslie | June 20, 1950 |

FOREIGN PATENTS

| Number | Country | Date |
|---|---|---|
| 513,766 | Great Britain | Oct. 23, 1939 |